United States Patent [19]
Fliedner, Jr.

[11] 3,872,113
[45] Mar. 18, 1975

[54] HYDROXY- AND ACETOXY-PHTHALALDEHYDRIC ACID, O-(SUBSTITUTED) OXIMES

[75] Inventor: Leonard J. Fliedner, Jr., Point Lookout, N.Y.

[73] Assignee: Endo Laboratories, Inc., Garden City, N.Y.

[22] Filed: Apr. 19, 1973

[21] Appl. No.: 352,739

Related U.S. Application Data

[63] Continuation-in-part of Ser. No. 257,642, May 30, 1972, abandoned.

[52] U.S. Cl. ............ 260/240 G, 424/248, 424/310, 260/247.7 A, 260/479 R, 260/521 A, 260/521 R, 260/566 AE
[51] Int. Cl. ... C09b 23/00, C07c 63/06, C07c 69/14
[58] Field of Search ........ 260/521 R, 521 A, 240 G, 260/479 R

[56] References Cited
UNITED STATES PATENTS
3,577,441 4/1971 Kaminsky et al. ............ 260/566 AE
FOREIGN PATENTS OR APPLICATIONS
1,130,685 10/1968 Great Britain ............... 260/566 AE OTHER PUBLICATIONS
Hayashi et al., Nippon Yakurigaku Zasshi, vol. 61, pp. 255–262, (1965).
Smith, The Chemistry of Open–Chain Organic Nitrogen Compounds, vol. II, pages 66 to 67, NY (1966).
Profft et al., Chemical Abstracts, vol. 63, col. 14741 (1965).
Ray et al., Chemical Abstracts, vol. 50, col. 11159 (1956).

*Primary Examiner*—John D. Randolph

[57] ABSTRACT

Compounds of the formula:

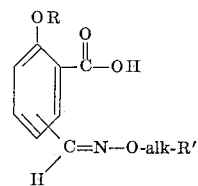

I and their pharmaceutically suitable salts, where alk is alkylene, R' is phenyl, substituted phenyl, or morpholino, and R is hydrogen or acetyl, useful as analgesics. Some are also useful as antipyretics, antiinflammatory agents and immunosuppressive agents. The compounds where R is hydrogen are prepared by reaction of a hydroxy-phthalaldehydic acid with an O-(substituted)hydroxylamine of the formula $H_2N-O-alk-R'$. The compounds where R is acetoxy are prepared by acetylation of the compounds wherein R is hydrogen.

12 Claims, No Drawings

HYDROXY- AND ACETOXY-PHTHALALDEHYDIC ACID, O-(SUBSTITUTED) OXIMES

CROSS REFERENCE TO RELATED APPLICATION

This application is a continuation-in-part of Application Ser. No. 257,642, filed May 30, 1972 now abandoned.

BACKGROUND OF THE INVENTION

Sekiya et al., Chem. Pharm. Bull. (Tokyo) 11, 551 (1963), discloses 6-hydroxyisophthalaldehydic acid oxime and 2-hydroxyisophthalaldehydic acid oxime, and their conversion to 5-aminomethylsalicylic acid and 3-aminomethylsalicylic acid, respectively. The reference states that 5-aminomethylsalicylic acid was found to possess an analgetic activity, but does not mention any pharmacological activity for any other disclosed compound.

SUMMARY OF THE INVENTION

This invention is a novel class of hydroxy- and acetoxyphthalaldehydic acid, O-(substituted)oximes which are useful as analgesics. Some of the compounds also exhibit antiinflammatory activity, some exhibit antipyretic activity, and some exhibit immunosuppressant activity. The compounds have the formula:

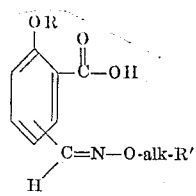

where
R is hydrogen or acetyl;
R' is phenyl, morpholino, or phenyl substituted with 1 or 2 substituents individually selected from Cl, F, Br, $NO_2$, $CF_3$, methoxy, and ethoxy; and
alk is alkylene of one, two, or three carbon atoms, provided that, when R' is morpholino, alk is ethylene or propylene. The invention also includes pharmaceutically suitable salts of the compounds of formula I.

The invention also includes methods for preparing the compounds of formula I, as disclosed hereinbelow.

DESCRIPTION OF THE INVENTION

The compounds of formula I where R is hydrogen can be prepared by reaction of a hydroxyphthalaldehydic acid with an O-(substituted)hydroxylamine, as illustrated by reaction scheme A:

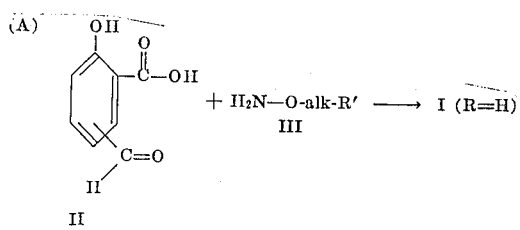

where alk and R' have the meanings given above.

The hydroxy-phthalaldehydic acids of formula II are all known compounds. They are disclosed in the following references:

Duff, J. C. and Bills, E. J., J. Chem. Soc. 1987 (1932): 6-hydroxyisophthalaldehydic acid and 2-hydroxyisophthalaldehydic acid.

French Pat. No. 853,676, Mar. 26, 1940: 2-hydroxyterephthalaldehydic acid.

Eliel, E. L. et al., J. Org. Chem., 18, 1679 (1953): 6-hydroxyphthalaldehydic acid.

The O-(substituted)hydroxylamines of formula III are in general known compounds, although certain ones of them may be novel. Preparation of 4-[2-(aminooxy)ethyl]morpholine dihydrochloride (salt of the compound of formula III where alk is ethylene and R' is morpholino) from acetone O-(2-hydroxyethyl)oxime p-toluenesulfonate is described in Paquette, L. A., J. Org. Chem., 29, 3545 (1964); the corresponding compounds of formula III wherein alk is trimethylene or propylene can be prepared similarly by substituting the appropriate acetone O-(hydroxyalkyl)oxime p-toluenesulfonate. Compounds of formula III wherein alk is methylene and R' is phenyl or substituted phenyl can be made from benzyl chlorides as described in Hamor et al., J. Pharm. Sci. 59, 1752 (1970); the corresponding compounds wherein alk is alkylene of 2 to 3 carbon atoms can be prepared similarly by substituting the appropriate aralkyl chlorides.

The process illustrated by reaction scheme A is carried out in water and/or inert organic solvents such as dimethylformamide, pyridine, methanol, ethanol and their mixtures. Water is preferred because of cost, but presence of at least some organic solvent is usually desirable to aid in dissolving the reactants. Compounds of formula III are most conveniently handled in the form of acid addition salts such as hydrochlorides, hydrobromides, hydroisodides, sulfates, or acid sulfates; in such cases a base such as pyridine should be present in at least stoichiometric amount to react with the acid released in the reaction. Temperatures in the range of about 20°C. to about 150°C. and pressures in the range of about 0.5–3 atmospheres can be used. Preferred conditions are atmospheric pressure and reflux temperatures in the range of 60°–110°C.

Compounds of formula I where R is acetyl are prepared by acetylation of the corresponding compounds where R is H:

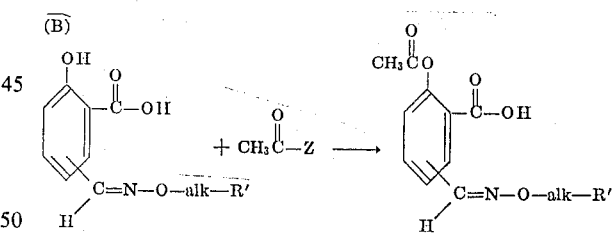

where Z is chlorine, bromine, $-OC_2H_5$ or

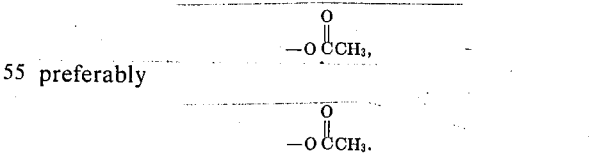

preferably $-O\overset{O}{\overset{\|}{C}}CH_3$.

The acetylation can be carried out in an inert solvent such as benzene, ether or toluene at a temperature of 0° to 110°C. (preferably 0° to 50°C.) and a pressure of 0.5 to 3 atmospheres (preferably 1 atmosphere) in the presence of a catalytic amount of a base such as an alkali metal hydroxide, triethylamine or pyridine.

Compounds of formula I wherein R' is morpholino can be used in the form of their pharmaceutically suitable acid addition salts. Examples of acids which form pharmaceutically suitable salts are: maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, adipic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids. All compounds of formula I can also be used in the form of their salts with pharmaceutically suitable cations, e.g., $Na^+$, $K^+$, $NH_4^+$ and $(Ca/2)^+$.

Compounds of this invention can be formulated into pharmaceutical compositions and administered orally to warm-blooded animals in pain and/or with an inflammation to produce an analgesic and/or antiinflammatory effect. Doses between about 0.1 and 100 mg/kg/day can be used. The preferred dosage range is 1 to 30 mg/kg/day. The daily dosage can be given all at once or in intervals of from 3 to 6 hours.

The pharmaceutical compositions of the invention comprise at least one compound of formula I or pharmaceutically suitable salts thereof and a pharmaceutical carrier. The compositions can be in the form of tablets, capsules, syrups, or suspensions, and can contain various other conventional additives, e.g., preservatives, coloring agents, flavoring agents, binders, suspending agents, and the like. The active ingredient will normally comprise 1 to 95 percent, preferably 5 to 90 percent, by weight, of the composition.

The analgesic activity of the compounds of this invention is shown in a Phenylquinone Writhing test (PQW test), as described below:

Phenylquinone Writhing: (Results given in mg/kg per os/mouse)

Groups of at least 10 mice are given phenyl-p-benzoquinone 2.5 mg/kg intraperitoneally 30 minutes after oral administration of graded doses of the test substance. Two or more dose levels are used for each compound. For scoring purposes, a "writhe" is defined as stretching, twisting of a hindleg inward, or contraction of the abdomen. The total number of writhes for each animal, treated and control animals side-by-side, are counted over a 30-minute time interval. An $ED_{50}$, calculated on basis of the percentage of animals at each dose level which showed 50 percent or less of the average number of writhes of the control animals, is reported for each compound submitted to this screening test.

The results obtained for some compounds of this invention are presented in the Table below. Codeine and aspirin were used as the standard analgesics for comparison. The compounds wherein R' is morpholino were tested as their hydrochloride salts.

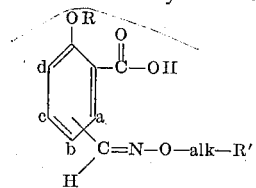

| Position of —CH=N—O—alk—R' | R' | R | Alk | $ED_{50}$ |
|---|---|---|---|---|
| b | Phenyl | H | —CH$_2$— | 200 |
| a | do | H | —CH$_2$— | 64 |
| a | p-Chlorophenyl | H | —CH$_2$— | 35 |
| b | do | H | —CH$_2$— | 350 |
| b | p-Fluorophenyl | H | —CH$_2$— | 45 |
| b | Morpholino | H | —CH$_2$CH$_2$— | 11 |
| a | m-Chlorophenyl | H | —CH$_2$— | 210 |
| a | p-Fluorophenyl | H | —CH$_2$— | 34 |
| a | m-Nitrophenyl | H | —CH$_2$— | 131 |
| a | o-Chlorophenyl | H | —CH$_2$— | 140 |
| a | p-Nitrophenyl | H | —CH$_2$— | 84 |
| a | m-Fluorophenyl | H | —CH$_2$— | 75 |
| a | p-Bromophenyl | H | —CH$_2$— | 57 |
| a | o-Fluorophenyl | H | —CH$_2$— | 49 |
| a | 3,4-dichlorophenyl | H | —CH$_2$— | 111 |
| a | m-(Trifluoromethyl)- | H | —CH$_2$— | ~320 |
| a | 2,4-dichlorophenyl | H | —CH$_2$— | 201 |
| a | o-Nitrophenyl | H | —CH$_2$— | 92 |
| a | p-Ethoxyphenyl | H | —CH$_2$— | 73 |
| d | p-Chlorophenyl | H | —CH$_2$— | 173 |
| d | Morpholino | H | —CH$_2$CH$_2$— | 72 |
| d | p-Fluorophenyl | H | —CH$_2$— | 20 |
| b | Phenyl | —$\overset{\overset{O}{\|}}{C}CH_3$ | —CH$_2$— | ~170 |
| b | p-Chlorophenyl | Same | —CH$_2$— | ~210 |
| Aspirin | | | | 94 |
| Codeine | | | | 19 |

Compounds of the invention were tested for antiinflammatory activity in an adjuvant arthritis test, as described below.

Adjuvant Arthritis

Male, CFE rats, weighing 150–200 grams are injected subcutaneously with 0.1 ml of a suspension of *Myobacterium butyricum* (Difco heat-killed, lyophilized cells) in mineral oil (5 mg/ml) into the plantar area of the right hind paw. Mineral oil injected rats serve as non-arthritic controls.

A period of 14 days is allowed for the arthritic process to develop maximally. The volume of the left hind paw (uninjected) of each rat is then measured by mercury displacement. The animals are rearranged into balanced groups of 10 (according to the degree of arthritic disease as indicated by paw size).

Drug treatment is begun on day 14, after the paw volume measurement and is continued for 7 days. Drugs are intubated once daily in 1 ml per 100 grams of body weight of PVA-Acacia medium (polyvinyl alcohol 1 percent, gum acacia 5 percent and methylparaben 0.5 percent). Paw volumes are measured again 24 hours after the last dose.

The paw volume measurement is recorded as the meter reading from a transducer-indicator that expresses proportionately the effect of mercury displacement on a suitably oriented strain gauge. The system is calibrated with a metal rod of known volume. The conversion of the mean meter reading to ml is obtained from a standard curve.

Increase in the paw volume of the uninjected hind paw is proportional to the development of arthritis in adjuvant-injected rats. Inhibition of paw volume increase in drug treated rats is indicative of anti-arthritic activity.

Treated group mean paw volume is compared to control group mean paw volume by student's $t$ test. When $P>0.05$ (95 percent confidence) the test compound is considered to be active.

The following compounds of this invention have been found active in this test at a daily oral dose of 100 mg/kg. (100–200 mg/kg for the first compound):

6-hydroxyphthalaldehydic acid, O-(p-chlorobenzyl)oxime
6-hydroxyphthalaldehydic acid, O-(m-fluorobenzyl)oxime
6-hydroxyphthalaldehydic acid, O-(m-chlorobenzyl)oxime
6-hydroxyphthalaldehydic acid, O-(3,4-dichlorobenzyl)oxime
6-hydroxyphthalaldehydic acid, O-[m-(trifluoromethyl)benzyl]oxime Immunosuppressive activity is shown by dose related reduction of antibody producing spleen cells in the hemolytic plaque assay of Jerne and Nordin [Science 140:405, 1963]. A compound of this invention which has shown activity in this assay is 6-hydroxyphthalaldehydic acid, O-(p-chlorobenzyl)oxime.

EXAMPLE 1

A solution of 6.64 g (0.04 mole) of 6-hydroxyisophthalaldehydic acid and 8.76 g (0.04 mole) of 4-[2-(aminooxy)ethyl]morpholine dihydrochloride in 85 ml of pyridineabsolute ethanol (1:1 by volume) was refluxed for 8 hours. The solvents were evaporated in vacuo and the residue triturated with a small volume of 10 percent ethanolic HCl. The mixture was cooled, filtered, and recrystallized from 95 percent ethanol to yield 6-hydroxyisophthalaldehydic acid, O-(2-morpholinoethyl)oxime hydrochloride, m.p. 204°–206°.

By substituting the appropriate benzyloxyamine hydrochlorides for the 4-[2-(aminooxy)ethyl]morpholine dihydrochloride, the following compounds can be prepared similarly:

6-hydroxyisophthalaldehydic acid, O-benzyloxime, m.p. 143°–149°C
6-hydroxyisophthalaldehydic acid, O-(p-chlorobenzyl)oxime, m.p. 166°–167°C
6-hydroxyisophthalaldehydic acid, O-p-fluorobenzyl)oxime, m.p. 162°–163°C.

EXAMPLE 2

A solution of 6.64 g (0.04 mole) of 6-hydroxyphthalaldehydic acid and 8.54 g (0.044 mole) of p-chlorobenzyloxyamine hydrochloride in 85 ml of pyridine-absolute ethanol (1:1 by volume) was refluxed for 10 hours. The solvents were evaporated in vacuo and the residue triturated with 100 ml of water. The resulting suspension was stirred while gradually treating with small portions of concentrated hydrochloric acid until a pH of 2–3 was reached. The solid was filtered, washed with water, dried, and recrystallized from 1,2-dichloroethane to yield 6-hydroxyphthalaldehydic acid, O-(p-chlorobenzyl)oxime, m.p. 162°–163°.

By substituting the appropriate benzyloxyamine hydrochlorides for the p-chlorobenzyloxyamine hydrochloride the following compounds can be prepared similarly:

6-hydroxyphthalaldehydic acid, O-benzyloxime, m.p. 93°–94°C
6-hydroxyphthalaldehydic acid, O-(m-chlorobenzyl)oxime, m.p. 133°–134°C
6-hydroxyphthalaldehydic acid, O-(p-fluorobenzyl)oxime, m.p. 168°–170°C
6-hydroxyphthalaldehydic acid, O-(m-nitrobenzyl)oxime, m.p. 156°–157°C
6-hydroxyphthalaldehydic acid, O-(o-chlorobenzyl)oxime, m.p. 120°–122°C
6-hydroxyphthalaldehydic acid, O-(p-nitrobenzyl)oxime, m.p. 170°–172°C
6-hydroxyphthalaldehydic acid, O-(m-fluorobenzyl)oxime, m.p. 114°–116°C
6-hydroxyphthalaldehydic acid, O-(p-bromobenzyl)oxime, m.p. 149°–150°C
6-hydroxyphthalaldehydic acid, O-(3,4-dichlorobenzyl)oxime, m.p. 160°–162°C
6-hydroxyphthalaldehydic acid, O-(o-bromobenzyl)oxime, m.p. 136°–137°C.
6-hydroxyphthalaldehydic acid, O[m-trifluoromethyl)benzyl]oxime, m.p. 135°–136°C.
6-hydroxyphthalaldehydic acid, O-(o-nitrobenzyl)oxime, m.p. 174°–176°C.
6-hydroxyphthalaldehydic acid, O-(2,4-dichlorobenzyl)oxime, m.p. 169°–171°C.
6-hydroxyphthalaldehydic acid, O-(2-morpholinoethyl)oxime hydrochloride, m.p. 151°–153°C.
6-hydroxyphthalaldehydic acid, O-(p-ethoxybenzyl)oxime, m.p. 132°–133°C.

EXAMPLE 3

A solution of 6.64 g (0.04 mole) of 2-hydroxyisophthalaldehydic acid and 8.54 g (0.044 mole) of p-chlorobenzyloxyamine hydrochloride in 50 ml of pyridine-absolute ethanol (1:1 by volume) was refluxed for 12 hours. The solvents were evaporated in vacuo and the residue triturated with 100 ml of water. The resulting suspension was stirred while gradually adding small portions of 3N hydrochloric acid until a pH of 2–3 was reached. The solid was filtered, washed with water, dried, and recystallized from 1,2-dichloroethane to yield 2-hydroxyisophthalaldehydic acid, O-(p-chlorobenzyl)oxime, m.p. 183°–184°.

By substituting p-fluorobenzyloxyamine hydrochloride or 4-[2-(aminooxy)ethyl]morpholine dihydrochloride for the p-chlorobenzyloxyamine hydrochloride, the following compounds can be prepared:

2-hydroxyisophthalaldehydic acid, O-(p-fluorobenzyl)oxime, m.p. 150°–151°C
2-hydroxyisophthalaldehydic acid, O-(2-morpholinoethyl)oxime hydrochloride, m.p. 198°–199°C.

EXAMPLE 4

A solution of 6.64 g (0.04 mole) of 2-hydroxyterephthalaldehydic acid and 7.82 g (0.044 mole) of p-fluorobenzyloxyamine hydrochloride in 50 ml of pyridine-absolute ethanol (1:1 by volume) was refluxed for 12 hours. The solvents were evaporated in vacuo and the residue treated with 300 ml of ether and 50 ml of 1N hydrochloric acid. The resulting mixture was shaken until two clear layers were obtained and then the aqueous layer was drawn off and discarded. The ethereal layer was washed again with 50 ml of 1N hydrochloric acid, followed by two washings with 200 ml portions of water. The ethereal layer was dried and evaporated in vacuo. The solid residue was recystallized from 1,2-dichloroethane to yield 2-hydroxyterephthalaldehydic acid, O-(p-fluorobenzyl)oxime, m.p. 179°–180°.

By substituting p-chlorobenzyloxyamine hydrochloride or 4-[2-(aminooxy)ethyl]morpholine dihydrochloride for p-fluorobenzyloxyamine, the following compounds can be prepared similarly:

2-hydroxyterephthalaldehydic acid, O-(p-chlorobenzyl)oxime, m.p. 190°–192°C 2-hydroxyterephthalaldehydic acid, O-(2-morpholinoethyl)oxime hydrochloride, m.p. 233°–234°C.

EXAMPLE 5

A mixture of 5.75 g (0.0212 mole) of 6-hydroxyisophthalaldehydic acid, O-benzyloxime, 30 ml of acetic anhydride, and one drop of pyridine was stirred and treated at 30°–35° for 30 minutes. The resulting solution was evaporated in vacuo (bath temperature <50°) to remove excess acetic anhydride and the oily residue treated with 100 ml of water and 100 ml of ether. After stirring vigorously for 24 hours, the aqueous layer was separated and discarded. The ethereal layer was washed further with water (4 × 25 ml), and saturated NaCl (2×100 ml). After drying over anhydrous Na$_2$SO$_4$, the ether was evaporated invacuo, and the residue recrystallized from benzene to yield 6acetoxyisophthalaldehydic acid, O-benzyloxime, m.p. 140°–141°.

EXAMPLE 6

A mixture of 10.0 g (0.033 mole) of 6-hydroxyisophthalaldehydic acid, O-(p-chlorobenzyl)oxime, 45 ml of acetic anhydride, and one drop of pyridine was stirred and heated at 30°–35° for 20 minutes. Excess acetic anhydride was evaporated in vacuo (bath temperature <50°) and the oily residue was treated with 100 ml of water and 100 ml of ethyl acetate. After stirring vigorously for 24 hours, the aqueous layer was separated and discarded. The organic layer was washed further with water (3×75 ml), and saturated NaCl (2×75 ml). After drying over anhydrous Na$_2$SO$_4$, the ethyl acetate was evaporated in vacuo, and the residue recrystallized from ethyl acetate to yield 6-acetoxyisophthalaldehydic acid, O-(p-chlorobenzyl)oxime, m.p. 156°–158°.

Example 7

| Ingredients | mg./Tablet |
| --- | --- |
| 6-hydroxyphthalaldehydic acid, O-(p-chlorobenzyl)oxime | 15 mg. |
| lactose, USP | 183 mg. |
| magnesium stearate, USP | 2 mg. |

The ingredients are passed through a sieve, blended for 20 minutes and compressed into tablets of 200 mg. on a table press using a 11/32 inch punch and die.

I claim:
1. Compound of the formula

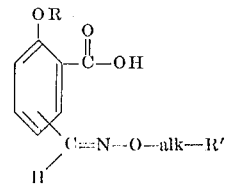

where
R is hydrogen or acetyl;
R' is phenyl, morpholino, or phenyl substituted with 1 or 2 substituents individually selected from Cl, F, Br, NO$_2$, CF$_3$, methoxy, and ethoxy; and
alk is alkylene of one, two, or three carbon atoms, provided that, when R' is morpholino, alk is ethylene, or propylene;
and their pharmaceutically suitable salts.

2. Compound of claim 1: 6-hydroxyisophthalaldehydic acid, O-(2-morpholinoethyl)oxime hydrochloride.

3. Compound of claim 1: 6-hydroxyphthalaldehydic acid, O-(p-chlorobenzyl)oxime.

4. Compound of claim 1: 6-hydroxyisophthalaldehydic acid, O-(p-fluorobenzyl)oxime.

5. Compound of claim 1: 6-hydroxyphthalaldehydic acid, O-(p-bromobenzyl)oxime.

6. Compound of claim 1: 6-hydroxyphthalaldehydic acid, O-benzyloxime.

7. Compound of claim 1: 6-hydroxyphthalaldehydic acid, O-(m-fluorobenzyl)oxime.

8. Compound of claim 1: 6-hydroxyphthalaldehydic acid, O-(m-chlorobenzyl)oxime.

9. Compound of claim 1: 6-hydroxyphthalaldehydic acid, O-(3,4-dichlorobenzyl)oxime.

10. Compound of claim 1: 6-hydroxyphthalaldehydic acid, O-[m-(trifluoromethyl)benzyl]oxime.

11. Compound of claim 1: 2-hydroxyisophthalaldehydic acid, O-(p-fluorobenzyl)oxime.

12. Compound of claim 1: 6-acetoxyisophthalaldehydic acid, O-benzyloxime.

* * * * *